US012811497B2

(12) United States Patent
Kim et al.

(10) Patent No.: US 12,811,497 B2
(45) Date of Patent: Nov. 24, 2026

(54) LOGICAL LINK CONTROL RESONANT CONVERTER AND ELECTRONIC DEVICE INCLUDING THE SAME

(71) Applicant: Samsung Electronics Co., Ltd., Suwon-si (KR)

(72) Inventors: Keonwoo Kim, Suwon-si (KR); Moonyoung Kim, Suwon-si (KR); Sangmin Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 97 days.

(21) Appl. No.: 18/676,052

(22) Filed: May 28, 2024

(65) Prior Publication Data

US 2024/0364214 A1 Oct. 31, 2024

Related U.S. Application Data

(63) Continuation of application No. PCT/KR2024/005429, filed on Apr. 22, 2024.

(30) Foreign Application Priority Data

Apr. 25, 2023 (KR) ........................ 10-2023-0054201

(51) Int. Cl.
*H02M 3/00* (2006.01)
*G09G 3/20* (2006.01)
(Continued)

(52) U.S. Cl.
CPC ................ *H02M 3/01* (2021.05); *G09G 3/20* (2013.01); *H01F 27/38* (2013.01); *H02M 3/003* (2021.05);
(Continued)

(58) Field of Classification Search
CPC .... H02M 3/01; H02M 3/003; H02M 3/33571; H02M 3/00; H02M 3/335;
(Continued)

(56) References Cited

U.S. PATENT DOCUMENTS 6,256,214 B1 7/2001 Farrington et al.
6,370,050 B1 4/2002 Peng et al.
(Continued)

FOREIGN PATENT DOCUMENTS

CN 102983747 A 3/2013
CN 206865350 U 1/2018
(Continued)

OTHER PUBLICATIONS

Search Report and Written Opinion dated Jul. 26, 2024 issued in International Patent Application No. PCT/KR2024/005429.
(Continued)

*Primary Examiner* — Crystal L Hammond
*Assistant Examiner* — Jonathan Walter Soileau
(74) *Attorney, Agent, or Firm* — Nixon & Vanderhye, P.C.

(57) ABSTRACT

Provided are a LLC resonant converter including a primary side circuit and a secondary side circuit, and a display device and an electronic device including the LLC resonant converter, wherein the secondary side circuit includes: a first diode including a first anode electrically connected to a first node, a second diode including a second anode electrically connected to the first node, a first inductor electrically connected between a first cathode of the first diode and a second node, a second inductor electrically connected between the second node and a second cathode of the second diode, a first capacitor electrically connected between the first node and the second node, a third inductor electrically connected between the first cathode and a third node, a
(Continued)

fourth inductor electrically connected between the second cathode and the third node, and a second capacitor electrically connected between the first node and the third node.

20 Claims, 17 Drawing Sheets

(51) Int. Cl.
*H01F 27/38* (2006.01)
*H02M 3/335* (2006.01)

(52) U.S. Cl.
CPC .... *H02M 3/33571* (2021.05); *G09G 2330/02* (2013.01)

(58) Field of Classification Search
CPC . H02M 3/33561; G09G 3/20; G09G 2330/02; G09G 3/32; G09G 3/2092; H01F 27/38; H05B 45/37; Y02B 70/10
See application file for complete search history.

(56) References Cited

U.S. PATENT DOCUMENTS

| | | | |
|---|---|---|---|
| 8,004,867 B2 | 8/2011 | Nakahori | |
| 8,238,122 B2 | 8/2012 | Torrico-Bascope et al. | |
| 8,339,812 B2 | 12/2012 | Martini et al. | |
| 8,717,784 B2 | 5/2014 | Park et al. | |
| 9,048,749 B2 | 6/2015 | Joo et al. | |
| 9,413,254 B2 | 8/2016 | Elias-palacios | |
| 10,122,286 B2 | 11/2018 | Stuler | |
| 10,193,455 B2 | 1/2019 | Moon et al. | |
| 10,277,130 B2 | 4/2019 | Quigley | |
| 10,770,979 B2 | 9/2020 | Sato et al. | |
| 2001/0009516 A1 | 7/2001 | Kato | |
| 2007/0247880 A1 | 10/2007 | Kwon et al. | |
| 2011/0273911 A1 | 11/2011 | Torrico-Bascope et al. | |
| 2017/0025956 A1* | 1/2017 | Matsushita | H02M 3/33561 |
| 2018/0130398 A1 | 5/2018 | Chun et al. | |
| 2021/0203186 A1* | 7/2021 | Hassler | H02J 50/12 |
| 2022/0158548 A1* | 5/2022 | Jang | G09G 3/20 |
| 2022/0158562 A1* | 5/2022 | Yang | H01F 3/14 |
| 2023/0170783 A1* | 6/2023 | Tian | H02M 1/0067 363/17 |
| 2026/0031717 A1* | 1/2026 | Yu | H02M 3/003 |

FOREIGN PATENT DOCUMENTS

| | | | |
|---|---|---|---|
| DE | 102017201364 | A1 | 8/2018 |
| JP | 3317950 | B2 | 8/2002 |
| JP | 2005057925 | A | 3/2005 |
| JP | 5257204 | B2 | 5/2013 |
| KR | 100691929 | B1 | 3/2007 |
| KR | 10-2012-0070949 | | 7/2012 |
| KR | 20130083536 | A | 7/2013 |
| KR | 10-2018-0013941 | | 2/2018 |
| KR | 10-2018-0020922 | | 2/2018 |
| KR | 101834617 | B1 | 3/2018 |
| KR | 101988089 | B1 | 6/2019 |
| KR | 10-2019-0098230 | | 8/2019 |
| KR | 102010698 | B1 | 8/2019 |
| KR | 10-2083301 | | 3/2020 |
| KR | 10-2125810 | | 6/2020 |
| KR | 10-2021-0048869 | | 5/2021 |
| KR | 10-2260299 | | 6/2021 |

OTHER PUBLICATIONS

Lee Min-Su et al., “A Phase-Shift Full-Bridge Converter with Novel Voltage Oscillation Clamping Circuit for Electric Vehicle on-Board Charger”, 10th International Conference on Power Electronics-ECCE Asia, May 27-30, 2019, 6 pages.

Bor-Ren Lin et al., “Analysis of Parallel-Connected Asymmetrical Soft-Switching Converter”, IEEE Transactions of Industrial Electronics, vol. 54, No. 3, Jun. 2007, 12 pages.

Extended Search Report dated Mar. 26, 2026 in EP Patent Application No. 24797367.0.

* cited by examiner

LOGICAL LINK CONTROL RESONANT CONVERTER AND ELECTRONIC DEVICE INCLUDING THE SAME

CROSS-REFERENCE TO RELATED APPLICATIONS

This application is a continuation of International Application No. PCT/KR2024/005429 designating the United States, filed on Apr. 22, 2024, in the Korean Intellectual Property Receiving Office and claiming priority to Korean Patent Application No. 10-2023-0054201, filed on Apr. 25, 2023, in the Korean Intellectual Property Office, the disclosures of each of which are incorporated by reference herein in their entireties.

BACKGROUND

Field

The disclosure relates to an LLC resonant converter and an electronic device including the same, and for example, to a structure of an LLC resonant converter, and a display device and an electronic device, which include a power supply including the LLC resonant converter.

Description of Related Art

Recently, with the development of technology, various types of electronic devices have developed. In a case of televisions (TVs) as an example, high-resolution or large TVs are being developed, and TVs providing various functions are being developed.

With the development of electronic devices, various components supporting different functions may be included in an electronic device.

An electronic device may include a power supply configured to supply power to each of a plurality of components included in the electronic device. The power supply of the electronic device may generate different types of power according to specifications of the plurality of components included in the electronic device, based on power received from an external source, and provide the different types of power to the plurality of components. The power supply may include an LLC resonant converter so as to generate the different types of power according to the specifications of the plurality of configurations, based on the power received from the external source.

SUMMARY

An LLC resonant converter according to an example embodiment of the disclosure includes: a primary side circuit and a secondary side circuit. The secondary side circuit may include: a first diode including a first anode electrically connected to a first node. The secondary side circuit may include a second diode including a second anode electrically connected to the first node. The secondary side circuit may include a first inductor configured to receive power through the primary side circuit and electrically connected between a first cathode of the first diode and a second node. The secondary side circuit may include a second inductor configured to receive power through the primary side circuit and electrically connected between the second node and a second cathode of the second diode. The secondary side circuit may include a first capacitor electrically connected between the first node and the second node.

The secondary side circuit may include a third inductor electrically connected between the first cathode of the first diode and a third node. The secondary side circuit may include a fourth inductor electrically connected between the second cathode of the second diode and the third node. The secondary side circuit may include a second capacitor electrically connected between the first node and the third node.

A display device according to an example embodiment of the disclosure includes a power supply including an LLC resonant converter including a primary side circuit and a secondary side circuit. The display device includes: a display and at least one processor configured to control an operation of the display. The power supply is configured to supply power to the at least one processor. The secondary side circuit may include a first diode including a first anode electrically connected to a first node. The secondary side circuit may include a second diode including a second anode electrically connected to the first node. The secondary side circuit may include a first inductor configured to receive power through the primary side circuit and electrically connected between a first cathode of the first diode and a second node. The secondary side circuit may include a second inductor configured to receive power through the primary side circuit and electrically connected between the second node and a second cathode of the second diode. The secondary side circuit may include a first capacitor electrically connected between the first node and the second node. The secondary side circuit may include a third inductor electrically connected between the first cathode of the first diode and a third node. The secondary side circuit may include a fourth inductor electrically connected between the second cathode of the second diode and the third node. The secondary side circuit may include a second capacitor electrically connected between the first node and the third node.

An electronic device according to an example embodiment of the disclosure includes a power supply including an resonant converter including: a primary side circuit and a secondary side circuit. The electronic device includes at least one processor configured to control an operation of the electronic device. The power supply is configured to supply power to the at least one processor. The secondary side circuit may include a first diode including a first anode electrically connected to a first node. The secondary side circuit may include a second diode including a second anode electrically connected to the first node. The secondary side circuit may include a first inductor configured to receive power through the primary side circuit and electrically connected between a first cathode of the first diode and a second node. The secondary side circuit may include a second inductor configured to receive power through the primary side circuit and electrically connected between the second node and a second cathode of the second diode. The secondary side circuit may include a first capacitor electrically connected between the first node and the second node. The secondary side circuit may include a third inductor electrically connected between the first cathode of the first diode and a third node. The secondary side circuit may include a fourth inductor electrically connected between the second cathode of the second diode and the third node. The secondary side circuit may include a second capacitor electrically connected between the first node and the third node.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
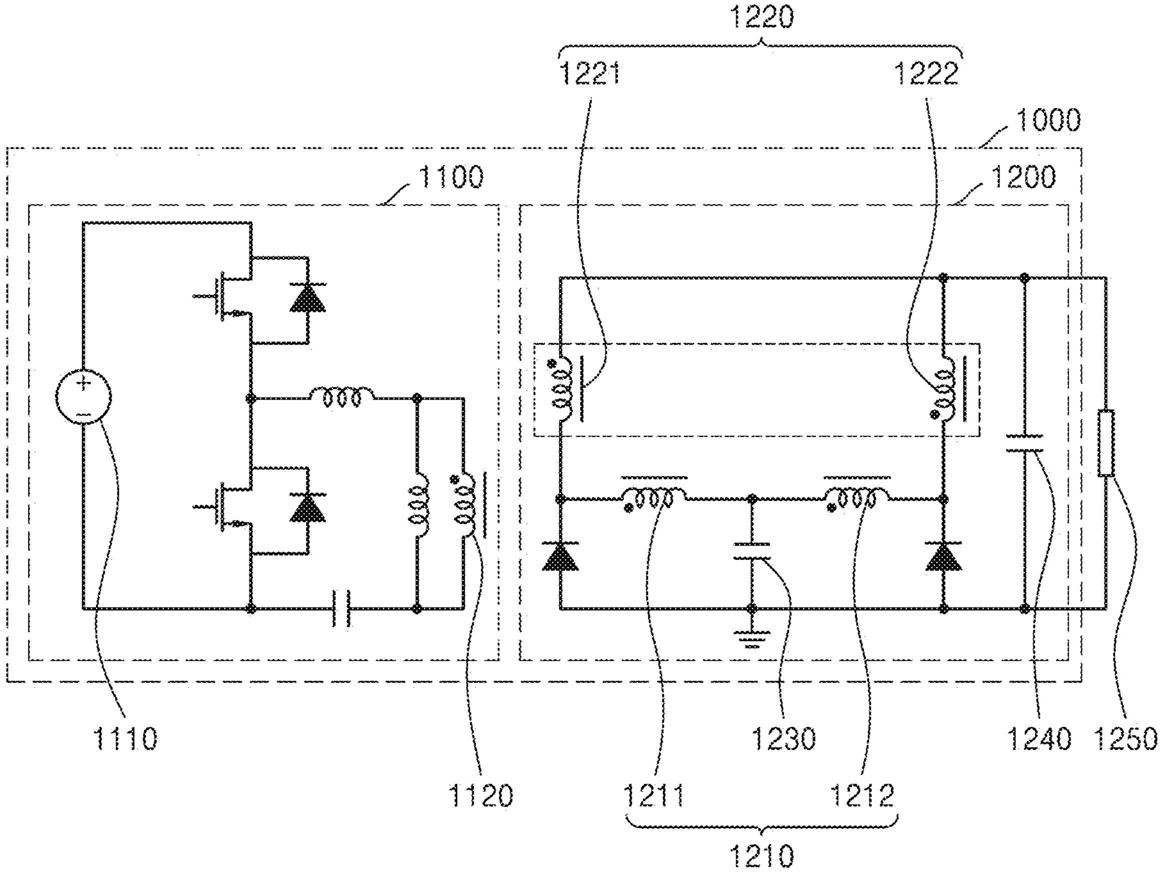
FIG. 1 is a circuit diagram illustrating an example configuration of an LLC resonant converter according to various embodiments.

The terms used in the disclosure will be briefly described, and various example embodiments of the disclosure will be described in greater detail.

All terms including descriptive or technical terms which are used herein should be construed as having meanings that will be apparent to one of ordinary skill in the art. However, the terms may have different meanings according to the intention of one of ordinary skill in the art, precedent cases, or the appearance of new technologies. Also, some terms may be arbitrarily selected, and in this case, the meaning of the selected terms will be described in detail in the detailed description of the disclosure. Thus, the terms used herein are to be defined based on the meaning of the terms together with the description throughout the disclosure.

An expression used in the singular may encompass the expression in the plural, unless it has a clearly different meaning in the context. Terms used herein, including technical or scientific terms, may have the same meaning as commonly understood by one of ordinary skill in the art described in the disclosure.

When a part “includes” or “comprises” an element, unless there is a particular description contrary thereto, the part may further include other elements, rather than excluding the other elements. In addition, terms such as “unit (-er/or)” and “module” described in the disclosure denote a unit that processes at least one function or operation, which may be implemented in hardware or software, or implemented in a combination of hardware and software.

The expression “configured to” used in the disclosure may be replaced by, for example, suitable for”, “having the capacity to”, “designed to”, “adapted to”, made to”, or “capable of”, according to situations. The expression “configured to” may not necessarily indicate “specifically designed to” in terms of hardware. Instead, in a certain situation, the expression “system configured to” may indicate that the system may be “capable of” together with another device or components. For example, “a processor configured to perform A, B, and C” may indicate a dedicated processor (e.g., an embedded processor) for performing corresponding operations or indicate a generic-purpose processor (e.g., a central processing unit (CPU) or an application processor) performing the corresponding operations by executing one or more software programs stored in a memory.

In the disclosure, it will be understood that when one element is “connected” or “coupled” to another element, the elements may be directly connected or coupled to each other, but may alternatively be connected or coupled to each other with an intervening element therebetween, unless specified otherwise.

Hereinafter, various example embodiments of the disclosure will be described in greater detail with reference to the accompanying drawings. However, embodiments of the disclosure may be implemented in various different forms and are not limited to any specific embodiment of the disclosure described herein. In the drawings, parts irrelevant to the description may be omitted in order to clearly describe an embodiment of the disclosure, and like reference numerals designate like elements throughout the disclosure.

Hereinafter, various example embodiments of the disclosure will be described in greater detail with reference to accompanying drawings.

FIG. 1 is a circuit diagram illustrating an example configuration of an LLC resonant converter according to various embodiments.

Referring to FIG. 1, FIG. 1 illustrates an LLC resonant converter 1000. According to an embodiment of the disclosure, the LLC resonant converter 1000 may include, as a converter included in a power supply, such as a switching mode power supply (SMPS), a primary side circuit 1100 including a primary side winding 1120, a resonant inductor, and a resonant capacitor, and a secondary side circuit 1200 including a secondary side winding 1210.

According to an embodiment of the disclosure, the LLC resonant converter 1000 may generate an output voltage by converting a received input voltage 1110 and provide power to a load 1250 electrically connected to the LLC resonant converter 1000 using the generated output voltage.

According to an embodiment of the disclosure. the primary side circuit 1100 of FIG. 1 includes a half-bridge structure including two switching devices, but the disclosure is not limited thereto. According to an embodiment of the disclosure, the primary side circuit 1100 may include a full-bridge structure.

According to an embodiment of the disclosure, the primary side circuit 1100 may include the input voltage 1110, the two switching devices, the resonant inductor, the resonant capacitor, and the primary side winding 1120. According to an embodiment of the disclosure, the primary side winding 1120 may be inductively coupled to the secondary side winding 1210 included in the secondary side circuit 1200. According to an embodiment of the disclosure, each of the two switching devices may be turned on or off, based on a switching signal.

According to an embodiment of the disclosure, when the two switching devices are alternately turned on and off, LLC resonance is generated by the resonant inductor, the resonant capacitor, and the primary side winding 1120, and a current is inducted to the secondary side winding 1210 through the primary side winding 1120.

According to an embodiment of the disclosure, the secondary side circuit 1200 may include the secondary side winding 1210 inductively coupled to the primary side winding 1120. According to an embodiment of the disclosure, the secondary side circuit 1200 may include two diodes electrically connected to the secondary side winding 1210, a current-doubler inductor 1220 electrically connected to the secondary side winding 1210, and a rectifying capacitor 1240. According to an embodiment of the disclosure, the secondary side circuit 1200 may include a clamp capacitor 1230 electrically connected to the middle of the secondary side winding 1210.

According to an embodiment of the disclosure, the primary side winding 1120 may be an inductor including the primary side winding 1120. The secondary side winding 1210 may be an inductor including the secondary side winding 1210. Hereinafter, for convenience of description, the primary side winding 1120 and the secondary side winding 1210 may each be referred to as an inductor.

According to an embodiment of the disclosure, the clamp capacitor 1230 may be referred to as a first capacitor 1230. The secondary side winding 1210 separated by the first capacitor 1230 may be referred to as a first inductor 1211 and a second inductor 1212. According to an embodiment of the disclosure, the rectifying capacitor 1240 may be referred to as a second capacitor 1240.

According to an embodiment of the disclosure, the current-doubler inductor 1220 may include a third inductor 1221 connected to one end of the first inductor 1211 and a fourth inductor 1222 connected to one end of the second inductor 1212. The third inductor 1221 and the fourth inductor 1222 may be inductively coupled to each other. According to an embodiment of the disclosure, a winding direction of the third inductor 1221 and a winding direction of the fourth inductor 1222 may be different from each other.

According to an embodiment of the disclosure, the load 1250 may be connected to both ends of the second capacitor 1240. According to an embodiment of the disclosure, the load 1250 may receive a load voltage by the LLC resonant converter 1000. According to an embodiment of the disclosure, the load 1250 may be a configuration included in a power supply including the LLC resonant converter 1000, which is to be described below, or a configuration included in a display device or electronic device configured to receive power generated by the power supply including the LLC resonant converter 1000.

According to an embodiment of the disclosure, an induction current induced by the primary side circuit 1100 may flow through the first inductor 1211 and the second inductor 1212. According to an embodiment of the disclosure, a size of the load current provided to the load 1250 may be twice greater than a size of the induction current of the third inductor 1221 and the fourth inductor 1222. Accordingly, a loss generated in the secondary side winding 1210 may be reduced by reducing the size of the induction current flowing through the first inductor 1211 and the second inductor 1212.

According to an embodiment of the disclosure, in an LLC resonant converter including a center-tap type secondary side circuit using, as an output capacitor, a capacitor connected to the middle of a secondary side winding, a size of an induction current flowing through the secondary side winding may be greater than the induction current flowing through the secondary side winding 1210 of the LLC resonant converter 1000 of the disclosure. Accordingly, the loss generated in the secondary side winding 1210 of the LLC resonant converter 1000 of the disclosure may be less than a loss generated in the center-tap type secondary side winding.

The size of the induction current flowing through the secondary side winding 1210 of the LLC resonant converter 1000 of the disclosure is reduced, and thus, a wiring ratio of the primary side winding 1120 and the secondary side winding 1210 may be reduced. Thus, a loss generated in the primary side winding 1120 may be reduced.

According to an embodiment of the disclosure, a current flowing through the current-doubler inductor 1220 may be referred to as an output current, the output current may include a current of a direct current component and a current of an alternating current component. According to an embodiment of the disclosure, the current of the direct current component of the output current may be provided to the load 1250. According to an embodiment of the disclosure, the current of the alternating current component of the output current may flow through the first capacitor 1230 and the second capacitor 1240.

According to an embodiment of the disclosure, the two diodes included in the secondary side circuit 1200 may be alternately turned on and off according to a direction of the induction current induced in the first inductor 1211 and the second inductor 1212. A stress voltage may be applied to the turned-off diode by at least one leakage inductance included in the secondary side circuit 1200. The leakage inductance may refer, for example, to an inductance caused by a leakage flux leaked from two inductively coupled inductors.

According to an embodiment of the disclosure, when the first capacitor 1230 that may perform a clamping function is connected between the secondary side wiring 1210, a size of the stress voltage applied to the turned-off diode may be determined by the leakage inductance by the first inductor 1211 and the second inductor 1212. According to an embodiment of the disclosure, the leakage inductance by the third inductor 1221 and the fourth inductor 1222 may not affect the stress voltage. Accordingly, the size of the stress voltage applied to the two diodes included in the secondary side circuit 1200 may be reduced by connecting the first capacitor 1230 to the middle of the secondary side wiring 1210.

Figure 2:
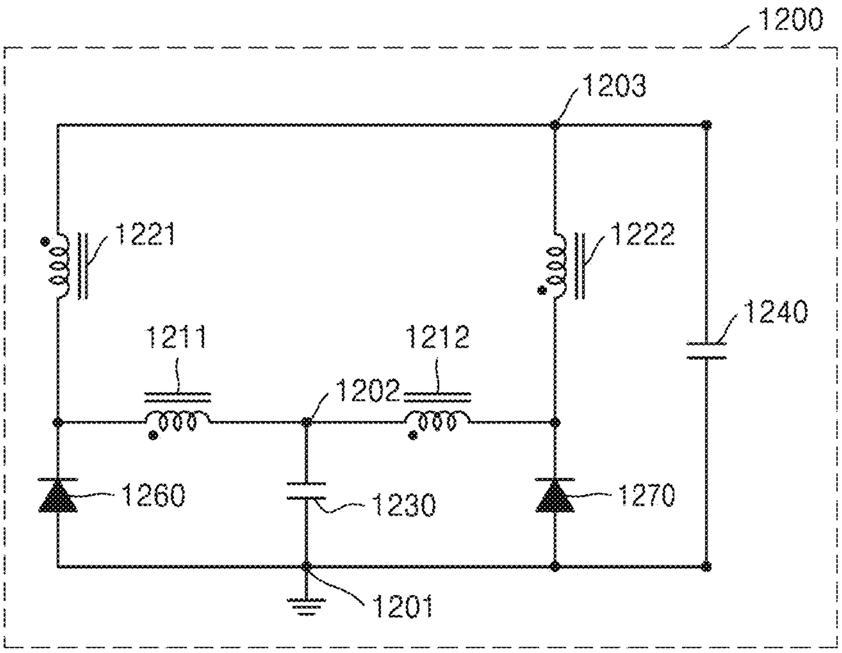
FIG. 2 is a circuit diagram illustrating an example configuration of a secondary side circuit of an LLC resonant converter, according to various embodiments.

FIG. 2 is a circuit diagram illustrating an example configuration of a secondary side circuit of an LLC resonant converter, according to various embodiments. Hereinafter, the same reference numerals are assigned to components that are same as or similar to those described with reference to FIG. 1 and redundant descriptions may not be repeated here.

Referring to FIGS. 1 and 2, the secondary side circuit 1200 of the LLC resonant converter 1000 is illustrated in FIG. 2.

According to an embodiment of the disclosure, the secondary side circuit 1200 may include the first inductor 1211, the second inductor 1212, the third inductor 1221, the fourth inductor 1222, the first capacitor 1230, the second capacitor 1240, a first diode 1260, and a second diode 1270.

According to an embodiment of the disclosure, the first capacitor 1230 may be connected between a first node 1201 and a second node 1202. According to an embodiment of the disclosure, one end of the first capacitor 1230 may be electrically connected to the first node 1201 and the other end of the first capacitor 1230 may be electrically connected to the second node 1202.

According to an embodiment of the disclosure, the first inductor 1211 may be connected between the second node 1202 and a first cathode of the first diode 1260. According to an embodiment of the disclosure, the first inductor 1211 may be electrically connected to the second node 1202 and the first cathode of the first diode 1260.

According to an embodiment of the disclosure, the second inductor 1212 may be connected between the second node 1202 and a second cathode of the second diode 1270. According to an embodiment of the disclosure, the second inductor 1212 may be electrically connected between the second node 1202 and the second cathode of the second diode 1270.

According to an embodiment of the disclosure, when the first inductor 1211 includes a first coil and the second inductor 1212 includes a second coil, the number of turns of the first coil and the number of turns of the second coil may be the same. According to an embodiment of the disclosure, a winding direction of the first coil and a winding direction of the second coil may be the same. According to an embodiment of the disclosure, a direction of an induction current flowing through the first inductor 1211 and a direction of an induction current flowing through the second inductor 1212 may be the same.

According to an embodiment of the disclosure, the first diode 1260 may be connected between the first node 1201 and the first inductor 1211. According to an embodiment of the disclosure, a first anode of the first diode 1260 may be electrically connected to the first node 1201. The first cathode of the first diode 1260 may be electrically connected to the first inductor 1211.

According to an embodiment of the disclosure, the second diode 1270 may be connected between the first node 1201 and the second inductor 1212. According to an embodiment of the disclosure, a second anode of the second diode 1270 may be electrically connected to the first node 1201. The second cathode of the second diode 1270 may be electrically connected to the second inductor 1212.

According to an embodiment of the disclosure, the third inductor 1221 may be connected between the first cathode of the first diode 1260 and a third node 1203. According to an embodiment of the disclosure, the third inductor 1221 may be electrically connected to the first cathode of the first diode 1260 and the third node 1203.

According to an embodiment of the disclosure, the fourth inductor 1222 may be connected between the second cathode of the second diode 1270 and the third node 1203. According to an embodiment of the disclosure, the fourth inductor 1222 may be electrically connected between the second cathode of the second diode 1270 and the third node 1203. According to an embodiment of the disclosure, the third inductor 1221 and the fourth inductor 1222 may be inductors that are inductively coupled to each other. According to an embodiment of the disclosure, when the third inductor 1221 includes a third coil and the fourth inductor 1222 includes a fourth coil, and a winding direction of the third coil and a winding direction of the fourth coil may be different from each other.

According to an embodiment of the disclosure, the second capacitor 1240 may be connected between the first node 1201 and the third node 1203. According to an embodiment of the disclosure, the second capacitor 1240 may be electrically connected between the first node 1201 and the third node 1203.

According to an embodiment of the disclosure, a reference voltage of the secondary side circuit 1200 may be provided to the first node 1201. According to an embodiment of the disclosure, a ground voltage may be provided to the first node 1201.

Figure 3:
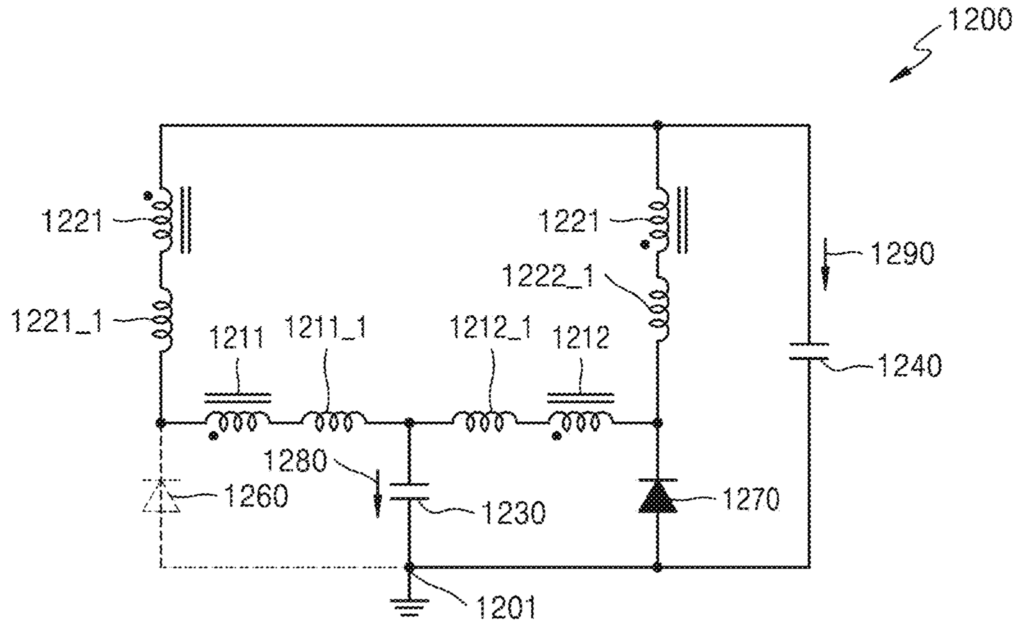
FIG. 3 is a circuit diagram illustrating example currents flowing through a first capacitor and a second capacitor of a secondary side circuit, according to various embodiments.

FIG. 3 is a circuit diagram illustrating example currents flowing through a first capacitor and a second capacitor of a secondary side circuit, according to various embodiments. Hereinafter, the same reference numerals are assigned to components that are same as or similar to those described with reference to FIGS. 1 and 2, and redundant descriptions may not be repeated here.

Referring to FIGS. 1 and 3, FIG. 3 illustrates that the secondary side circuit 1200 includes a plurality of leakage inductors each including leakage inductance, for convenience of description.

According to an embodiment of the disclosure, FIG. 3 illustrates the secondary side circuit 1200 including a first leakage inductor 1211_1 by the first inductor 1211, a second leakage inductor 1212_1 by the second inductor 1212, a third leakage inductor 1221_1 by the third inductor 1221, and a fourth leakage inductor 1222_1 by the fourth inductor 1222.

According to an embodiment of the disclosure, in the secondary side circuit 1200 of FIG. 3, the first diode 1260 is turned off and the second diode 1270 is turned on, but the disclosure is not limited thereto. According to an embodiment of the disclosure, the first diode 1260 may be turned on and the second diode 1270 may be turned off according to an operation of the LLC resonant converter 1000.

According to an embodiment of the disclosure, an output current may flow through the secondary side circuit 1200, wherein the output current is induced to the first inductor 1211 and the second inductor 1212 from the primary side circuit 1100, and then has an increased size by alternative turn-on and turn-off operations of the first diode 1260 and the second diode 1270 and by the third inductor 1221 and the fourth inductor 1222.

A current of an alternating current component of the output current may be divided and flow through the first capacitor 1230 and the second capacitor 1240. Among the currents of the alternating current component of the output current, a current flowing through the first capacitor 1230 may be referred to as a first current 1280 and among the currents of the alternating current component of the output current, a current flowing through the second capacitor 1240 may be referred to as a second current 1290.

According to an embodiment of the disclosure, a ratio of a size of the first current 1280 to a size of the second current 1290 may be determined by sizes of the first to fourth leakage inductors 1211_1 to 1222_1 included in the secondary side circuit 1200.

According to an embodiment of the disclosure, a sum of the leakage inductance of the first leakage inductor 1211_1 and the leakage inductance of the second leakage inductor 1212_1 may be referred to as a leakage inductance of the secondary side winding 1210, and a sum of the leakage inductance of the third leakage inductor 1221_1 and the leakage inductance of the fourth leakage inductor 1222_1 may be referred to as a leakage inductance of the current-doubler inductor 1220. The ratio of the size of the first current 1280 to the size of the second current 1290 may be determined according to a ratio of a size of the leakage inductance of the secondary side winding 1210 to a size of the leakage inductance of the current-doubler inductor 1220.

According to an embodiment of the disclosure, when the size of the leakage inductance of the secondary side winding 1210 and the size of the leakage inductance of the current-doubler inductor 1220 are the same, the size of the first current 1280 and the size of the second current 1290 may also be the same.

According to an embodiment of the disclosure, when the size of the leakage inductance of the secondary side winding 1210 is greater than the size of the leakage inductance of the current-doubler inductor 1220, the size of the first current 1280 may be smaller than the size of the second current 1290.

According to an embodiment of the disclosure, when the size of the leakage inductance of the secondary side winding 1210 is smaller than the size of the leakage inductance of the current-doubler inductor 1220, the size of the first current 1280 may be greater than the size of the second current 1290.

Figure 4A:
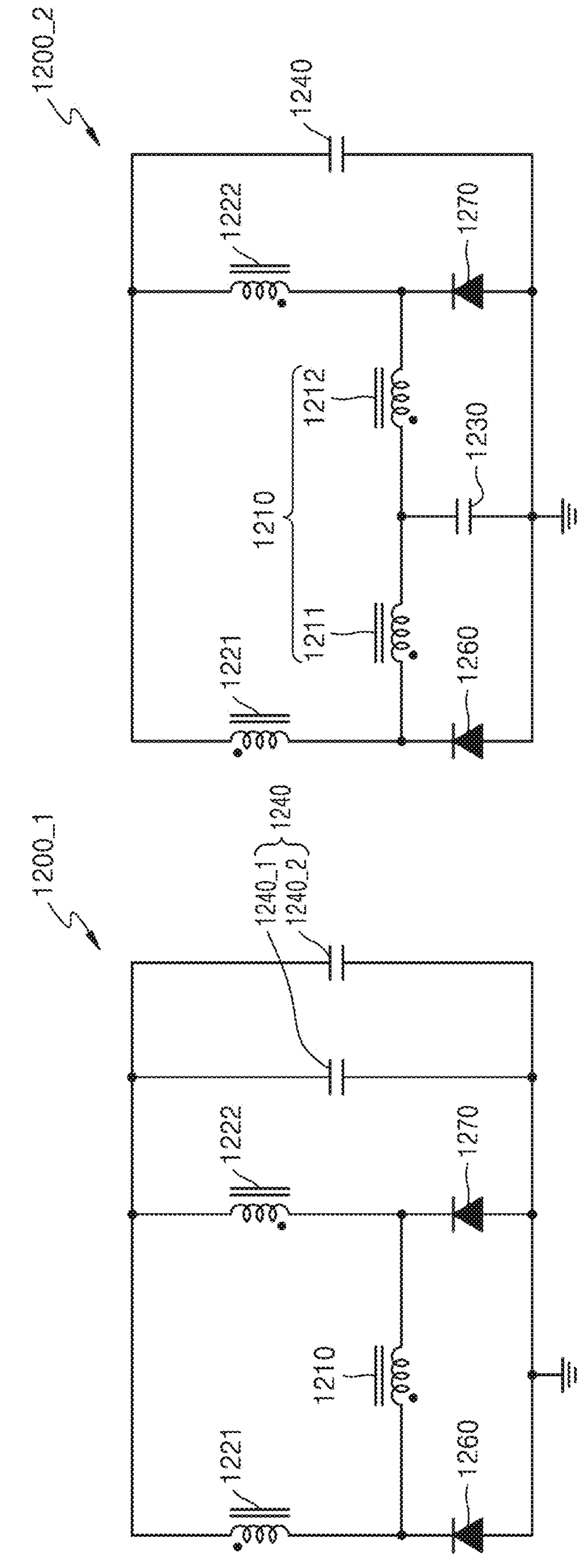
FIG. 4A is a circuit diagram illustrating an example arrangement of a first capacitor and a second capacitor of a secondary side circuit, according to various embodiments.
Figure 4B:
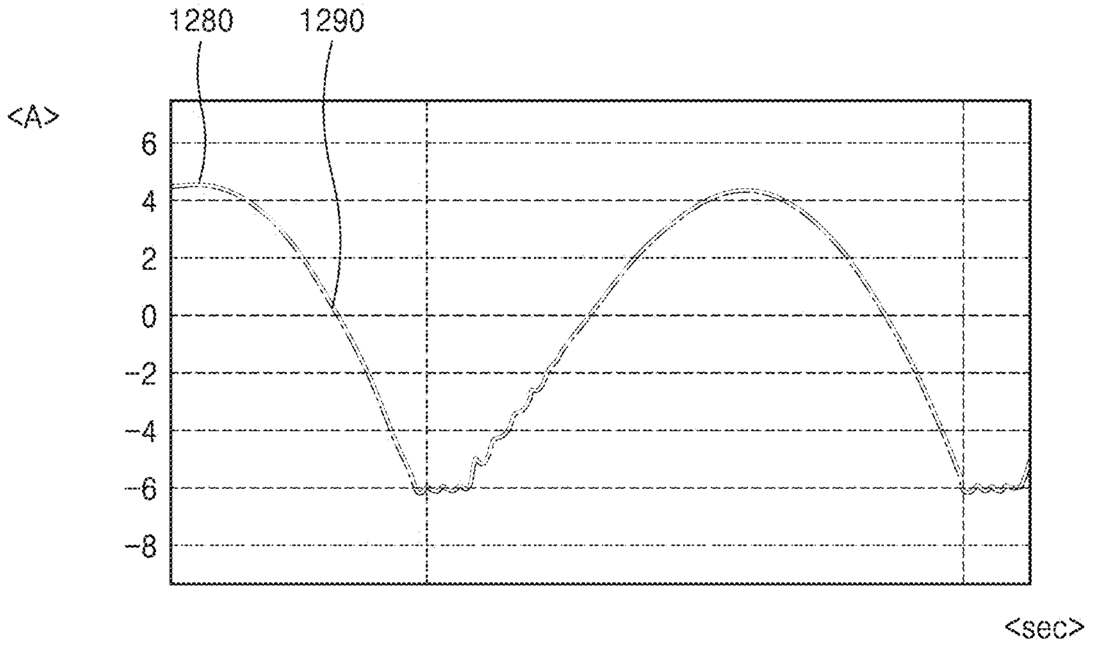
FIG. 4B is a graph illustrating current flowing through a first capacitor and a current flowing through a second capacitor of a secondary side circuit, according to various embodiments.

FIG. 4A is a circuit diagram illustrating an example arrangement of a first capacitor and a second capacitor of a secondary side circuit, according to various embodiments. FIG. 4B is a graph illustrating a current flowing through a first capacitor and a current flowing through a second capacitor of a secondary side circuit, according to various embodiments. Hereinafter, same reference numerals are assigned to components that are same as or similar to those described with reference to FIGS. 1 and 3, and redundant descriptions may not be repeated here.

Referring to FIGS. 3 and 4A, FIG. 4A illustrates a secondary side circuit 1200_1 of the prior art, in which a clamp capacitor is not connected to the middle of the secondary side winding 1210, and a secondary side circuit 1200_2 of the disclosure, in which the clamp capacitor 1230 is connected to the middle of the secondary side winding 1210.

According to an embodiment of the disclosure, in the secondary side circuit 1200_1 of the prior art, a current of an alternating current component of an output current may flow to the second capacitor 1240 connected between a first node and a third node. Accordingly, the second capacitor 1240 may include a first sub-capacitor 1240_1 and a second sub-capacitor 1240_2 so as to endure stress caused by all currents of alternating current component of the output current.

According to an embodiment of the disclosure, in the secondary side circuit 1200_2 of the disclosure, a current of an alternating current component of an output current may be divided and flow to the first capacitor 1230 and the second capacitor 1240. Accordingly, compared to the secondary side circuit 1200_1 of the prior art, the secondary side circuit 1200_2 of the disclosure may have a smaller number of second capacitors 1240 connected between the first node and the second node.

According to an embodiment of the disclosure, in the secondary side circuit 1200_2 of the disclosure, the first capacitor 1230 is connected between the first node and the second node to reduce a size of a stress voltage applied to the first diode 1260 and the second diode 1270, while maintaining the number of a plurality of capacitors included in a circuit to be the same as the secondary side circuit 1200_1.

FIG. 4B is a graph illustrating the first current 1280 flowing through the first capacitor 1230 and the second current 1290 flowing through the second capacitor 1240, when a size of leakage inductance of the secondary side winding 1210 and a size of leakage inductance of the current-doubler inductor 1220 are the same. Here, an x-axis is a time axis and units thereof may be second (sec). A y-axis denotes a size of a current and units thereof may be ampere (A).

Referring to FIGS. 4A and 4B, when the size of the leakage inductance of the secondary side winding 1210 and the size of the leakage inductance of the current-doubler inductor 1220 are the same, the size of the first current 1280 and the size of the second current 1290 may be the same. According to an embodiment of the disclosure, when the numbers of first capacitors 1230 and second capacitors 1240 included in the secondary side winding 1210 are the same, a capacitance of the first capacitor 1230 and a capacitance of the second capacitor 1240 may be determined according to a ratio of the size of the first current 1280 to the size of the second current 1290. Accordingly, the capacitance of the first capacitor 1230 and the capacitance of the second capacitor 1240 may be the same.

However, the disclosure is not limited thereto. In FIG. 4A, the size of the leakage inductance of the secondary side winding 1210 and the size of the leakage inductance of the current-doubler inductor 1220 are the same, and thus, the size of the first current 1280 and the size of the second current 1290 are the same and characteristics (e.g., the capacitance or an allowable current) of the first capacitor 1230 and characteristics of the second capacitor 1240 are the same.

However, according to an embodiment of the disclosure, when the characteristics of the first capacitor 1230 and the characteristics of the second capacitor 1240 are different from each other despite that the size of the leakage inductance of the secondary side winding 1210 and the size of the leakage inductance of the current-doubler inductor 1220 are the same, the number of first capacitors 1230 connected between the first node and the second node may be different from the number of second capacitors 1240 connected between the first node and the third node.

According to an embodiment of the disclosure, when the size of the leakage inductance of the secondary side winding 1210 and the size of the leakage inductance of the current-doubler inductor 1220 are different from each other despite that the characteristics of the first capacitor 1230 and the characteristics of the second capacitor 1240 are the same, the size of the first current 1280 and the size of the second current 1290 are different from each other, and thus, the number of first capacitors 1230 connected between the first node and the second node may be different from the number of second capacitors 1240 connected between the first node and the third node. Hereinafter, for convenience of description, it is described that the characteristics of the first capacitor 1230 and the characteristics of the second capacitor 1240 are the same.

Figure 5A:
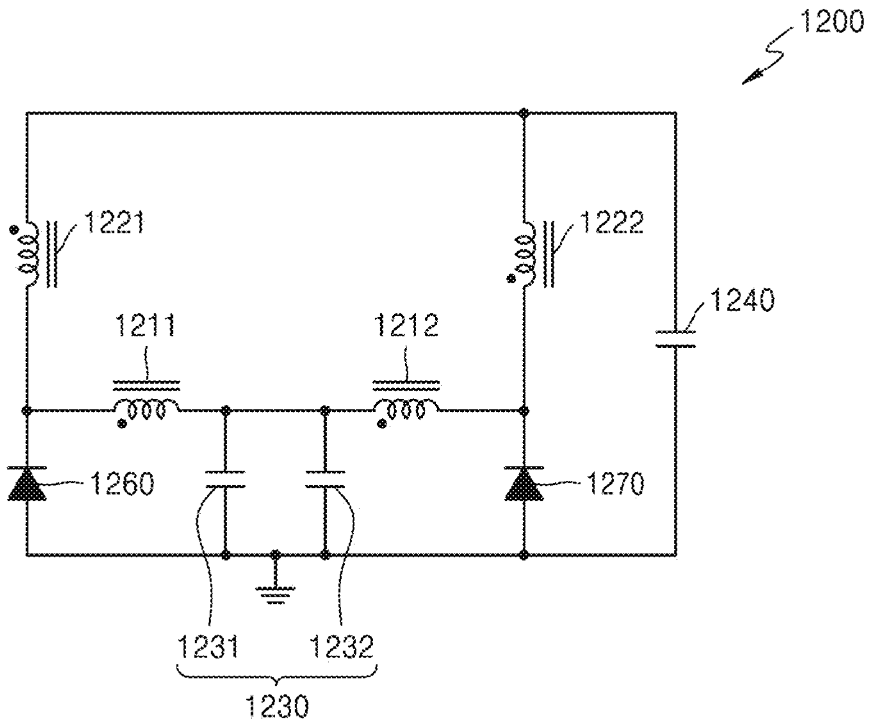
FIG. 5A is a circuit diagram illustrating an example arrangement of a first capacitor and a second capacitor of a secondary side circuit, according to various embodiments.
Figure 5B:
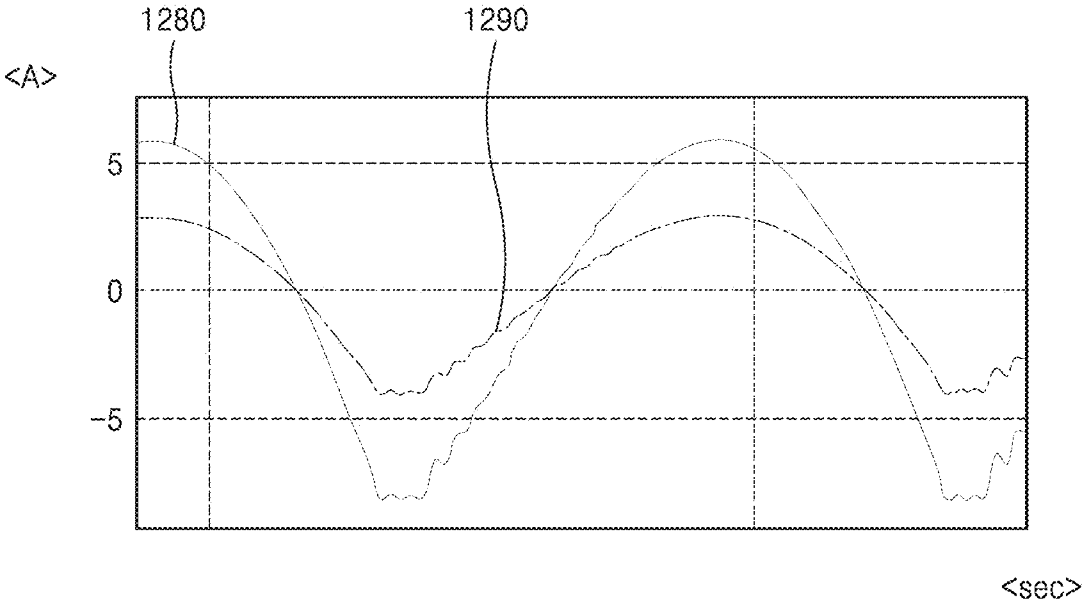
FIG. 5B is a graph illustrating current flowing through a first capacitor and a current flowing through a second capacitor of a secondary side circuit, according to various embodiments.

FIG. 5A is a circuit diagram illustrating an example arrangement of a first capacitor and a second capacitor of a secondary side circuit, according to various embodiments. FIG. 5B is a graph illustrating a current flowing through a first capacitor and a current flowing through a second capacitor of a secondary side circuit, according to various embodiments. Hereinafter, same reference numerals are assigned to components that are same as or similar to those described with reference to FIGS. 4A and 4B, and redundant descriptions may not be repeated here.

Referring to FIG. 5A, according to an embodiment of the disclosure, the first capacitor 1230 may include a plurality of first sub-capacitors 1231 and 1232, which are connected in parallel to each other. In FIG. 5A, the two first sub-capacitors 1231 and 1232 are illustrated, but the first capacitor 1230 may include three or more first sub-capacitors.

Referring to FIGS. 5A and 5B, FIG. 5B is a graph of the first current 1280 flowing through the first capacitor 1230 and the second current 1290 flowing through the second capacitor 1240 when the size of the leakage inductance of the secondary side winding 1210 is smaller than the size of the leakage inductance of the current-doubler inductor 1220. Here, an x-axis is a time axis and units thereof may be second (sec). A y-axis denotes a size of a current and units thereof may be ampere (A).

According to an embodiment of the disclosure, when the size of the leakage inductance of the secondary side winding 1210 is smaller than the size of the leakage inductance of the current-doubler inductor 1220, the size of the first current 1280 may be greater than the size of the second current 1290. Accordingly, a size of stress caused by the first current 1280 provided to the first capacitor 1230 may be greater than a size of stress caused by the second current 1290 provided to the second capacitor 1240. Accordingly, the first capacitor 1230 may include two first sub-capacitors 1231 and 1232 that are connected in parallel to each other, thereby dispersing the stress caused by the first current 1280.

Figure 6A:
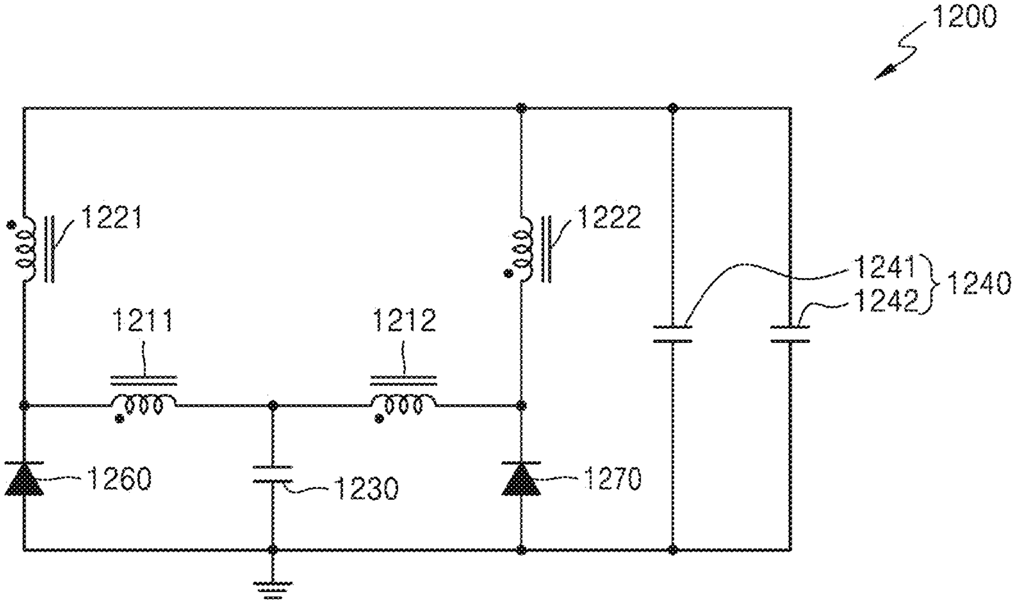
FIG. 6A is a circuit diagram illustrating an example arrangement of a first capacitor and a second capacitor of a secondary side circuit, according to various embodiments.
Figure 6B:
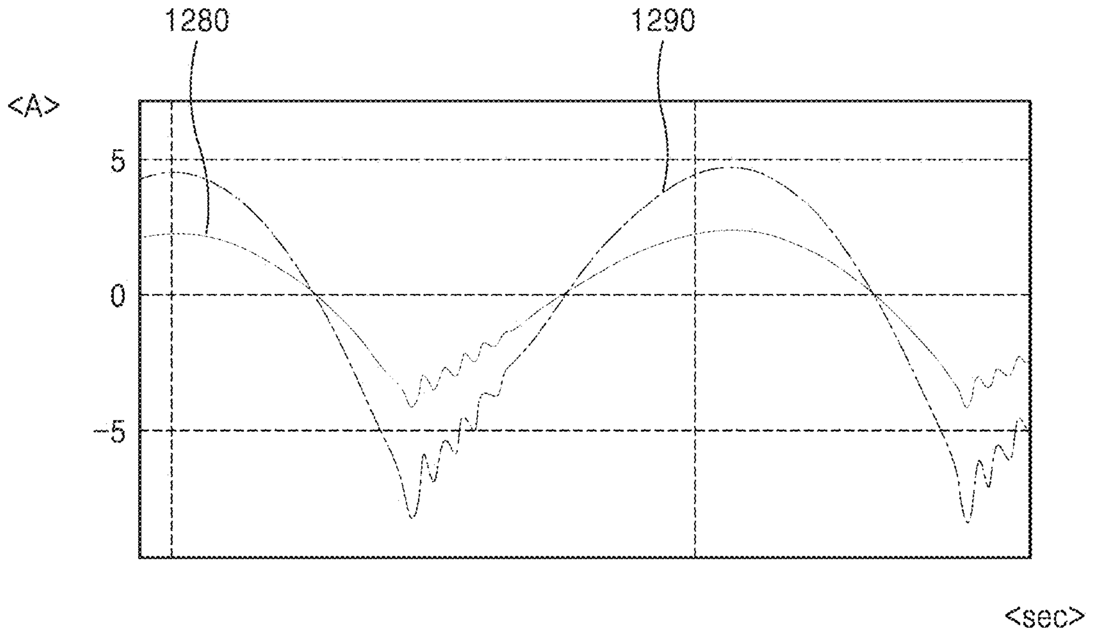
FIG. 6B is a graph illustrating current flowing through a first capacitor and a current flowing through a second capacitor of a secondary side circuit, according to various embodiments.

FIG. 6A is a circuit diagram illustrating an example arrangement of a first capacitor and a second capacitor of a secondary side circuit, according to various embodiments. FIG. 6B is a graph illustrating a current flowing through a first capacitor and a current flowing through a second capacitor of a secondary side circuit, according to various embodiments. Hereinafter, same reference numerals are assigned to components that are same as or similar to those described with reference to FIGS. 4A to 5B, and redundant descriptions may not be repeated here.

Referring to FIG. 6A, according to an embodiment of the disclosure, the second capacitor 1240 may include a plurality of second sub-capacitors 1241 and 1242, which are connected in parallel to each other. In FIG. 6A, the two second sub-capacitors 1241 and 1242 are illustrated, but the second capacitor 1240 may include three or more second sub-capacitors.

FIG. 6B is a graph of the first current 1280 flowing through the first capacitor 1230 and the second current 1290 flowing through the second capacitor 1240, when the size of the leakage inductance of the secondary side winding 1210 is greater than the size of the leakage inductance of the current-doubler inductor 1220. Here, an x-axis is a time axis and units thereof may be second (sec). A y-axis denotes a size of a current and units thereof may be ampere (A).

Referring to FIGS. 6A and 6B, according to an embodiment of the disclosure, when the size of the leakage inductance of the secondary side winding 1210 is greater than the size of the leakage inductance of the current-doubler inductor 1220, the size of the first current 1280 may be smaller than the size of the second current 1290. Accordingly, a size of stress caused by the second current 1290 provided to the second capacitor 1240 may be greater than a size of stress caused by the first current 1280 provided to the first capacitor 1230. Accordingly, the second capacitor 1240 may include two second sub-capacitors 1241 and 1242 that are connected in parallel to each other, thereby dispersing the stress caused by the first current 1280.

Referring to FIGS. 4A to 6B, according to an embodiment of the disclosure, the first capacitor 1230 may include a plurality of first sub-capacitors that are connected in parallel to each other. The second capacitor 1240 may include a plurality of second sub-capacitors that are connected in parallel to each other. When characteristics (e.g., a capacitance or an allowable current) of each of the plurality of first sub-capacitors are the same as or similar to characteristics of each of the plurality of second sub-capacitors, a ratio of the number of plurality of first sub-capacitors to the number of plurality of second sub-capacitors may be determined according to the ratio of the size of the first current 1280 to the size of the second current 1290.

Figure 7A:
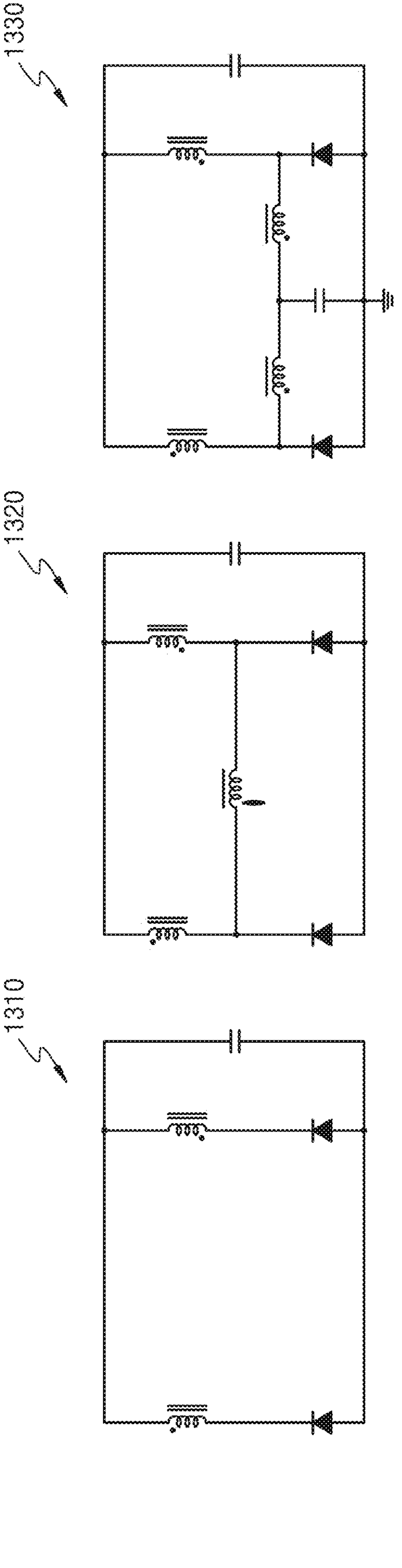
FIG. 7A is a circuit diagram illustrating example currents flowing through a first inductor and a second inductor of a secondary side circuit, according to various embodiments.
Figure 7B:
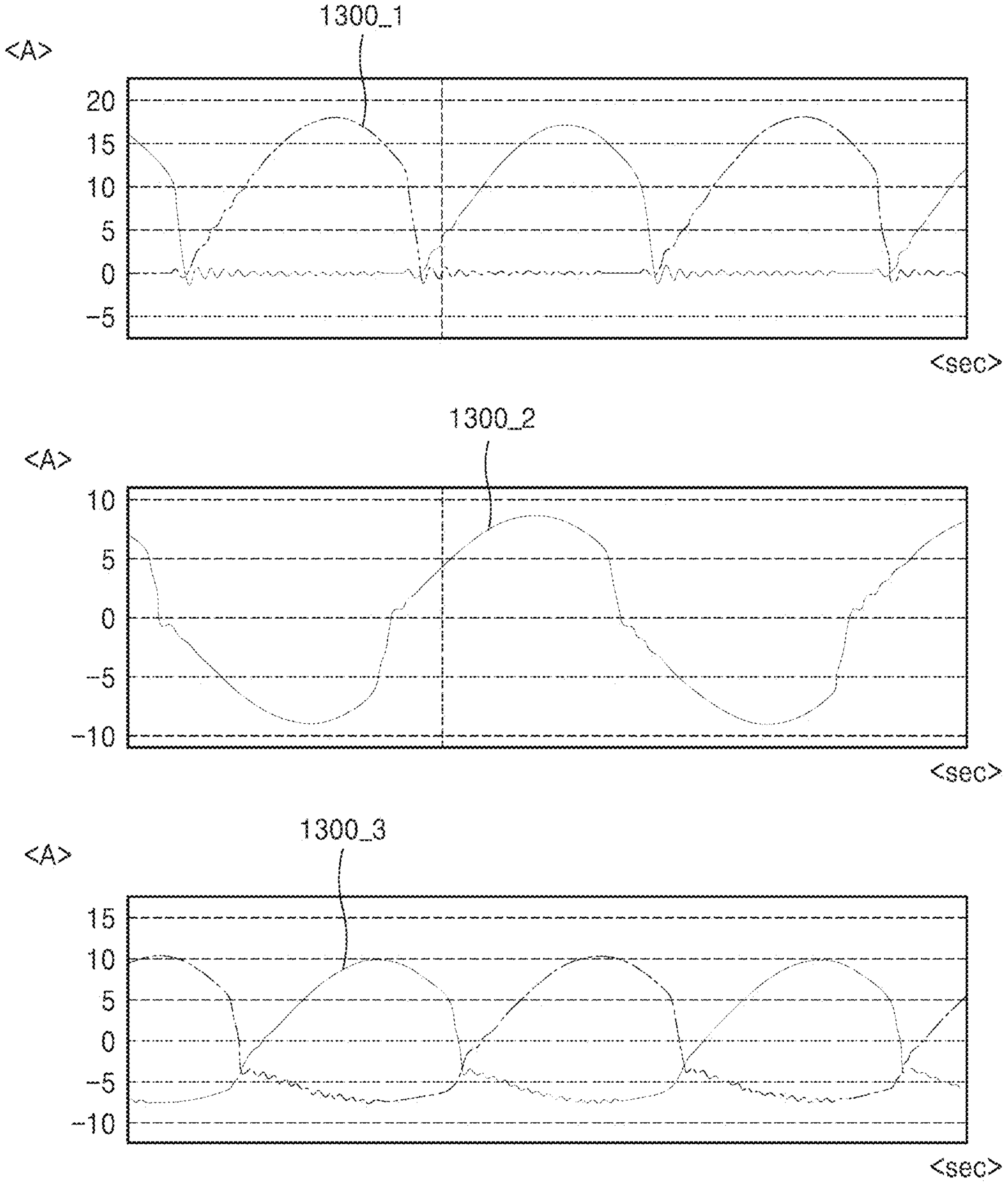
FIG. 7B includes graphs illustrating example currents flowing through a first inductor and a second inductor of a secondary side circuit, according to an embodiment of the disclosure.

FIG. 7A is a circuit diagram illustrating example currents flowing through a first inductor and a second inductor of a secondary side circuit, according to various embodiments. FIG. 7B includes graphs illustrating currents flowing through a first inductor and a second inductor of a secondary side circuit, according to various embodiments.

Referring to FIG. 7A, FIG. 7A illustrates the secondary side circuit of an LLC resonant converter. According to an embodiment of the disclosure, the secondary side circuit may include a first circuit 1310 having a center-tap structure, a second circuit 1320 having a current-doubler structure, and a third circuit 1330 having a structure according to the disclosure. Here, for convenience of description, in all of the first circuit 1310, the second circuit 1320, and the third circuit 1330, a secondary side winding through which a current induced through a primary side winding is referred to as a first inductor and a second inductor.

FIG. 7B is a graph of a first induction current 1300_1 flowing through the first inductor and the second inductor when the secondary side circuit is the first circuit 1310, a graph of a second induction current 1300_2 flowing through the first inductor and the second inductor when the secondary side circuit is the second circuit 1320, and a graph of a third induction current 1300_3 flowing through the first inductor and the second inductor when the secondary side circuit is the third circuit 1330. Here, each x-axis is a time axis and units thereof may be second (sec). Each y-axis denotes a size of a current and units thereof may be ampere (A). Also, the first induction current 1300_1, the second induction current 1300_2, and the third induction current 1300_3 may be currents that needs to be induced to the first inductor and the second inductor so as to provide a load current of a same size to the load 1250 (see FIG. 1) connected to the LLC resonant converter.

Referring to FIGS. 7A and 7B, according to an embodiment of the disclosure, a root-mean-square (RMS) of the second induction current 1300_2 when the secondary side circuit is the second circuit 1320 having the current-doubler structure may be smaller than an RMS of the first induction current 1300_1 when the secondary side circuit is the first circuit 1310 having the center-tap structure.

According to an embodiment of the disclosure, an RMS of the third induction current 1300_3 when the secondary side circuit is the third circuit 1330 having the structure of the disclosure, e.g., the first capacitor 1230 (see FIG. 1) and the second capacitor 1240 (see FIG. 1), may be smaller than the RMS of the first induction current 1300_1 when the secondary side circuit is the first circuit 1310 having the center-tap structure. According to an embodiment of the disclosure, the RMS of the second induction current 1300_2 and the RMS of the third induction current 1300_3 may be the same.

Accordingly, when the secondary side circuit of the LLC resonant converter has a structure of the third circuit 1330 of the disclosure, the size of the induction current that is to flow through the first inductor and the second inductor so as to provide the load current to the load 1250 may be decreased. Accordingly, losses at the first inductor and the second inductor may be reduced.

Figure 8A:
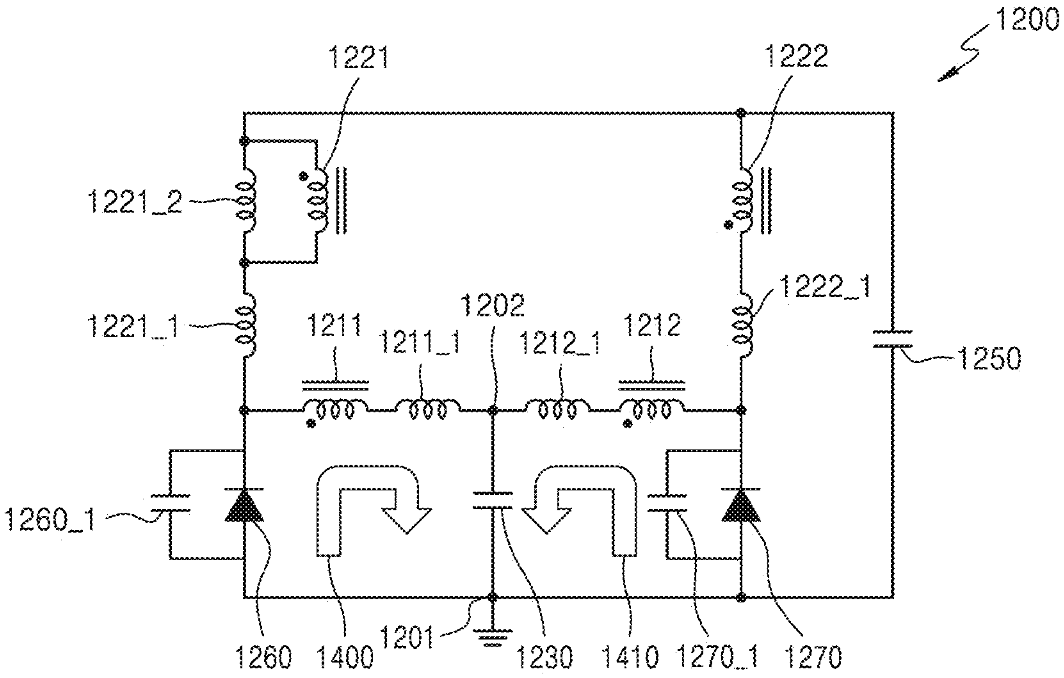
FIG. 8A is a circuit diagram illustrating an example reduction in a stress voltage applied by a first capacitor to a first diode and a second diode, according to various embodiments.
Figure 8B:
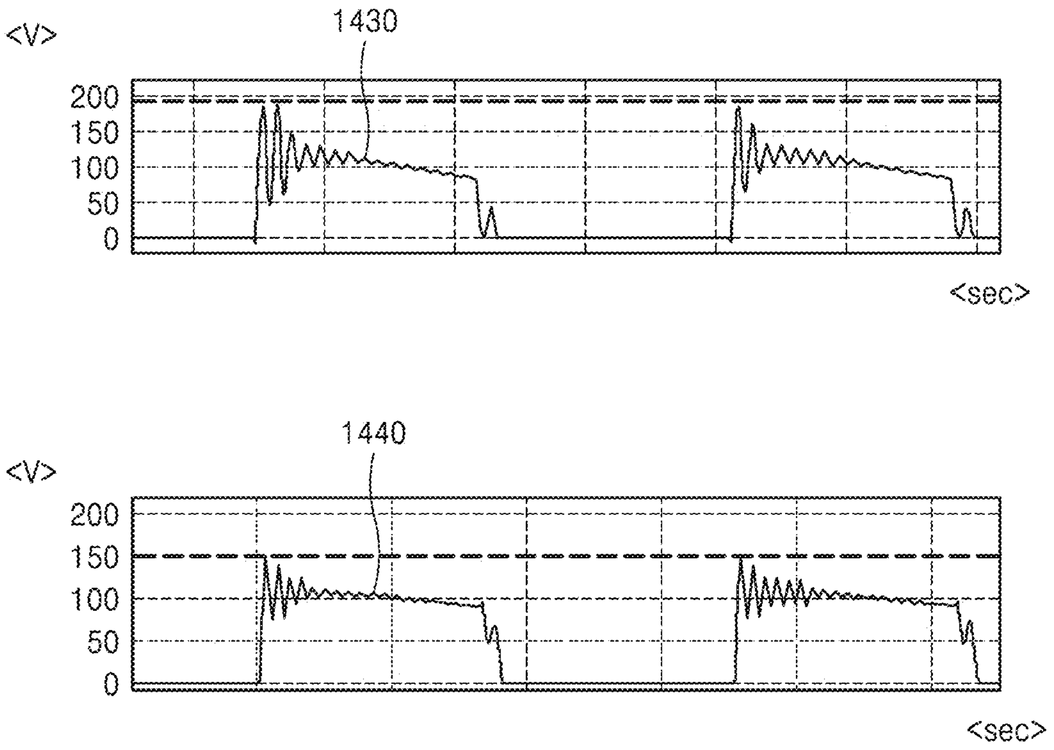
FIG. 8B includes graphs illustrating example reduction in a stress voltage applied by a first capacitor to a first diode and a second diode, according to various embodiments.

FIG. 8A is a circuit diagram for describing reduction in a stress voltage applied by a first capacitor to a first diode and a second diode, according to various embodiments. FIG. 8B includes graphs illustrating reduction in a stress voltage applied by a first capacitor to a first diode and a second diode, according to various embodiments. Hereinafter, same reference numerals are assigned to components that are same as or similar to those described with reference to FIGS. 1 and 3, and redundant descriptions may not be repeated here.

According to an embodiment of the disclosure, FIG. 8A illustrates that the secondary side circuit 1200 further includes a magnetizing inductor 1221_2 having a magnetizing inductance component generated by inductively coupling between the third inductor 1221 and the fourth inductor 1222. However, the disclosure is not limited thereto and the secondary side circuit 1200 may be illustrated as if it does not include the magnetizing inductor 1221_2.

FIG. 8A illustrates a first clamping path 1400 related to a stress voltage applied to the first diode 1260 when the first diode 1260 included in the secondary side circuit 1200 is turned off and a second clamping path 1410 related to a stress voltage applied to the second diode 1270 when the second diode 1270 is turned off. Here, the first clamping path 1400 and the second clamping path 1410 may be paths associated to the stress voltages applied to the first diode 1260 and the second diode 1270 during alternative turn-on and turn-off operations of the first diode 1260 and the second diode 1270, which are different from a power path associated with the load current provided to the load 1250.

According to an embodiment of the disclosure, the secondary side circuit 1200 includes the first capacitor 1230 electrically connected between the first node 1201 and the second node 1202 between the first inductor 1211 and the second inductor 1212, and thus, the first clamping path 1400 is generated to include the first diode 1260, a first parasitic capacitor 1260_1 of the first diode 1260, the first inductor 1211, the first leakage inductor 1211_1, and the first capacitor 1230.

According to an embodiment of the disclosure, the stress voltage of the first diode 1260 when the first diode 1260 is turned off may be determined by the first leakage inductor 1211_1 and the first parasitic capacitor 1260_1 from among components included in the first clamping path 1400.

According to an embodiment of the disclosure, the second clamping path 1410 is generated to include the second diode 1270, a second parasitic capacitor 1270_1 of the second diode 1270, the second inductor 1212, the second leakage inductor 1212_1, and the first capacitor 1230.

According to an embodiment of the disclosure, the stress voltage of the second diode 1270 when the second diode 1270 is turned off may be determined by the second leakage inductor 1212_1 and the second parasitic capacitor 1270_1 from among components included in the second clamping path 1410.

Referring to FIGS. 7A, 8A, and 8B, FIG. 8B is a graph of a first stress voltage 1430 applied to any one diode included in the second circuit 1320 having the current-doubler structure, which does not include the first capacitor 1230 in the secondary side circuit 1200, and a graph of a second stress voltage 1440 applied to any one diode included in the third circuit 1330 having the structure of the disclosure, which includes the first capacitor 1230. Here, each x-axis is a time axis and units thereof may be second (sec). Each y-axis denotes a size of a voltage and units thereof may be volt (V).

According to an embodiment of the disclosure, when the secondary side circuit 1200 has a structure of the second circuit 1320 that does not include the first capacitor 1230, a clamping circuit associated with the stress voltage of the first diode 1260 may include, in addition to the first leakage inductor 1211_1 and the first parasitic capacitor 1260_1, the second leakage inductor 1212_1 and the fourth leakage inductor 1222_1. When the first capacitor 1230 is not included in the secondary side circuit 1200, a clamping circuit associated with the stress voltage of the second diode 1270 may include, in addition to the second leakage inductor 1212_1 and the first parasitic capacitor 1260_1, the first leakage inductor 1211_1 and the third leakage inductor 1221_1.

According to an embodiment of the disclosure, compared to a case where the secondary side circuit 1200 has the structure of the second circuit 1320, when the secondary side circuit 1200 has the structure of the third circuit 1330 of the disclosure, which includes the first capacitor 1230, the number of circuit components associated with the stress voltage applied to the first diode 1260 or the second diode 1270 is reduced. Accordingly, a size of the second stress voltage 1440 when a diode is turned off may be smaller than a size of the first stress voltage 1430 when the diode is turned off.

Figure 9A:
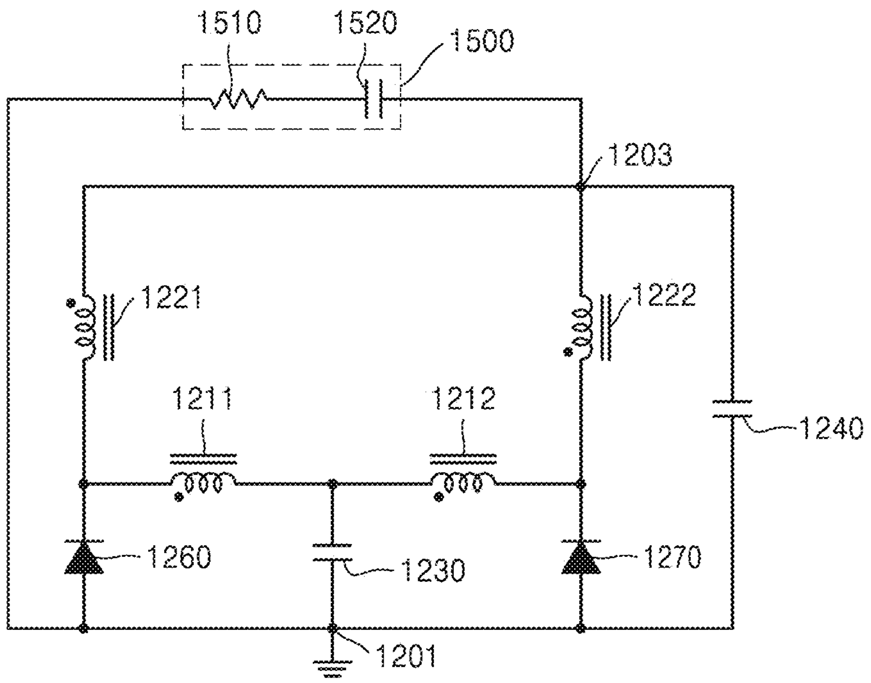
FIG. 9A is a circuit diagram illustrating an example snubber circuit connected to a secondary side circuit, according to various embodiments.
Figure 9B:
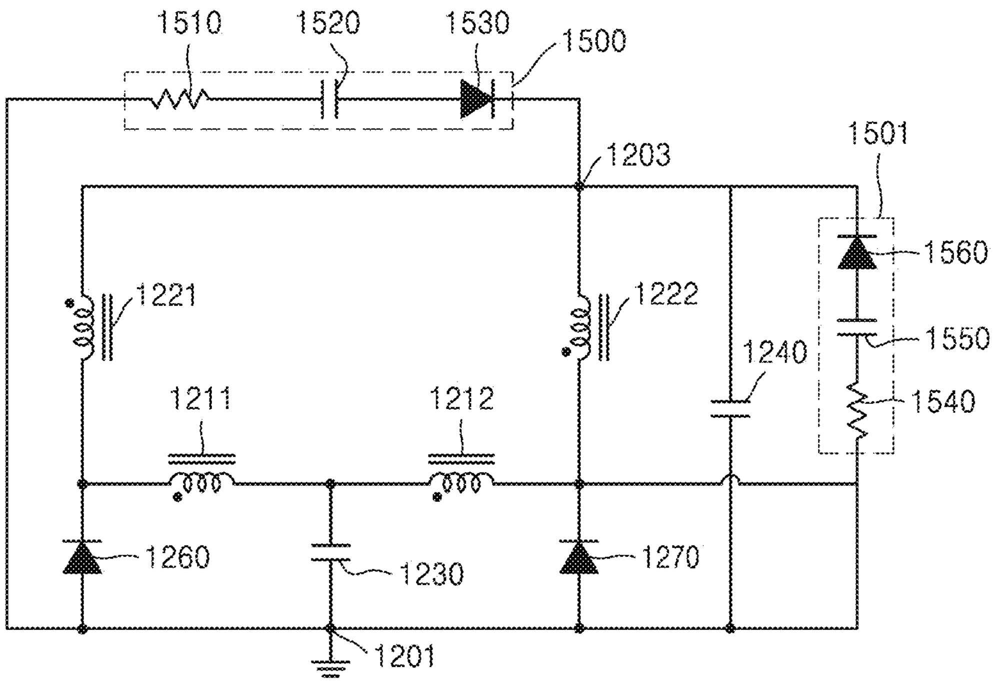
FIG. 9B is a circuit diagram illustrating an example snubber circuit connected to a secondary side circuit, according to various embodiments.

FIG. 9A is a circuit diagram illustrating an example snubber circuit connected to a secondary side circuit, according to various embodiments. FIG. 9B is a circuit diagram illustrating an example snubber circuit connected to a secondary side circuit, according to various embodiments. Hereinafter, same reference numerals are assigned to components that are same as or similar to those described with reference to FIGS. 1 and 2, and redundant descriptions may not be repeated here.

Referring to FIGS. 2 and 9A, the secondary side circuit 1200 may further include a first snubber circuit 1500 connected between the first node 1201 and the third node 1203. According to an embodiment of the disclosure, the first snubber circuit 1500 may be electrically connected between the first node 1201 and the third node 1203.

According to an embodiment of the disclosure, the first snubber circuit 1500 may be a circuit for suppressing a transient voltage instantaneously applied to the first diode 1260 or the second diode 1270, during the alternative turn-on and turn-off operations of the first diode 1260 and the second diode 1270 included in the secondary side circuit 1200.

According to an embodiment of the disclosure, the first snubber circuit 1500 may include a first resistor 1510 and a third capacitor 1520. According to an embodiment of the disclosure, the first resistor 1510 may be electrically connected to the first node 1201. The third capacitor 1520 may be electrically connected between the first resistor 1510 and the third node 1203.

According to an embodiment of the disclosure, when the first diode 1260 or the second diode 1270 is turned off, a transient current may pass through the first snubber circuit 1500, thereby reducing the size of the stress voltage applied to the first diode 1260 or the second diode 1270.

Referring to FIGS. 2 and 9B, the secondary side circuit 1200 according to an embodiment of the disclosure may further include the first snubber circuit 1500 and a second snubber circuit 1501, which are connected between the first node 1201 and the third node 1203. According to an embodiment of the disclosure, the first snubber circuit 1500 and the second snubber circuit 1501 may be electrically connected between the first node 1201 and the third node 1203.

According to an embodiment of the disclosure, the first snubber circuit 1500 may include the first resistor 1510, the third capacitor 1520, and a third diode 1530. According to an embodiment of the disclosure, the first resistor 1510 may be electrically connected to the first node 1201. The third capacitor 1520 may be electrically connected to the first resistor 1510. The third diode 1530 may include a third anode electrically connected to the third capacitor 1520 and a third cathode electrically connected to the third node 1203.

According to an embodiment of the disclosure, the second snubber circuit 1501 may include a second resistor 1540, a fourth capacitor 1550, and a fourth diode 1560. According to an embodiment of the disclosure, the second resistor 1540 may be electrically connected to the first node 1201. The fourth capacitor 1550 may be electrically connected to the second resistor 1540. The fourth diode 1560 may include a fourth anode electrically connected to the fourth capacitor 1550 and a fourth cathode electrically connected to the third node 1203.

According to an embodiment of the disclosure, when the first diode 1260 is turned off, a transient current flows through the first snubber circuit 1500, and thus, the size of the stress voltage applied to the first diode 1260 may be reduced. According to an embodiment of the disclosure, when the second diode 1270 is turned off, a transient current flows through the second snubber circuit 1501, and thus, the size of the stress voltage applied to the second diode 1270 may be reduced.

Figure 10:
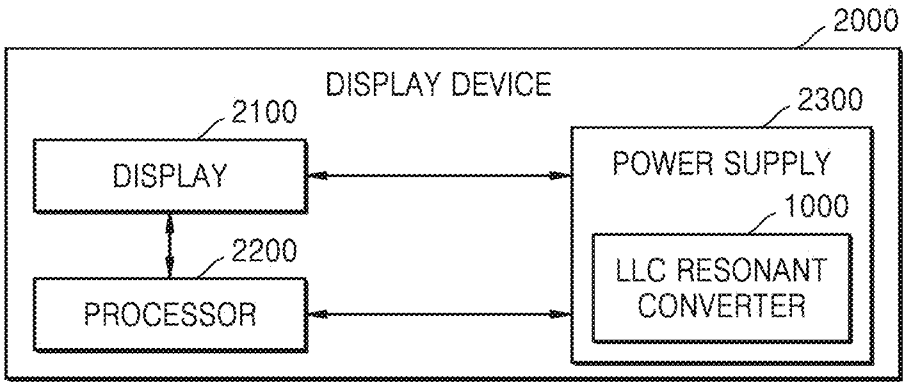
FIG. 10 is a block diagram illustrating an example configuration of a display device including a power supply that includes an LLC resonant converter, according to various embodiments.

FIG. 10 is a block diagram illustrating an example configuration of a display device including a power supply that includes an LLC resonant converter, according to various embodiments.

Referring to FIG. 10, according to an embodiment of the disclosure, a display device 2000 may be realized as any type of display device, such as, for example, and without limitation, a television (TV), a digital signage, a projector, a mobile device, a smartphone, a laptop computer, a desktop computer, a tablet personal computer (PC), a wearable device, or the like.

According to an embodiment of the disclosure, the display device 2000 may include a display 2100, at least one processor (e.g., including processing circuitry) 2200, and a power supply 2300. However, the components of the display device 2000 shown in FIG. 10 are not all essential components. The display device 2000 may be implemented by more components than those illustrated in FIG. 10 or the display device 2000 may be implemented by fewer components than those illustrated in FIG. 10.

According to an embodiment of the disclosure, the display 2100, the at least one processor 2200, and the power supply 2300 may be electrically and/or physically connected to each other.

According to an embodiment of the disclosure, the display 2100 may include, for example, and without limitation, any one display from among a liquid crystal display, a plasma display, an organic light-emitting diode display, an inorganic light-emitting diode display, or the like. However, the disclosure is not limited thereto, and the display 2100 may include another type of display that may provide an image to a user using the display device 2000.

According to an embodiment of the disclosure, the at least one processor 2200 may be configured as at least one of a central processing unit, a microprocessor, a graphics processing unit, an application processor (AP), an application-specific integrated circuit (ASIC), a digital signal processor (DSP), a digital signal processing device (DSPD), a programmable logic device (PLD), a field programmable gate array (FPGS), and an artificial intelligence (AI) dedicated processor designed in a hardware structure specified for training and processing of a neural processing unit or an AI model, but is not limited thereto. The at least one processor 2200 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to an embodiment of the disclosure, the at least one processor 2200 may control operations of the display device 2000.

According to an embodiment of the disclosure, the power supply 2300 may supply, to the at least one processor 2200, power required for operations of the at least one processor 2200. According to an embodiment of the disclosure, the power supply 2300 may include the LLC resonant converter 1000 of the disclosure. The power supply 2300 may provide, to the at least one processor 2200, power of at least one power required for operations of the at least one processor 2200, based on the output voltage generated through the LLC resonant converter 1000. Also, the power supply 2300 may supply, to the display 2100, power required for operations of the display 2100.

Figure 11:
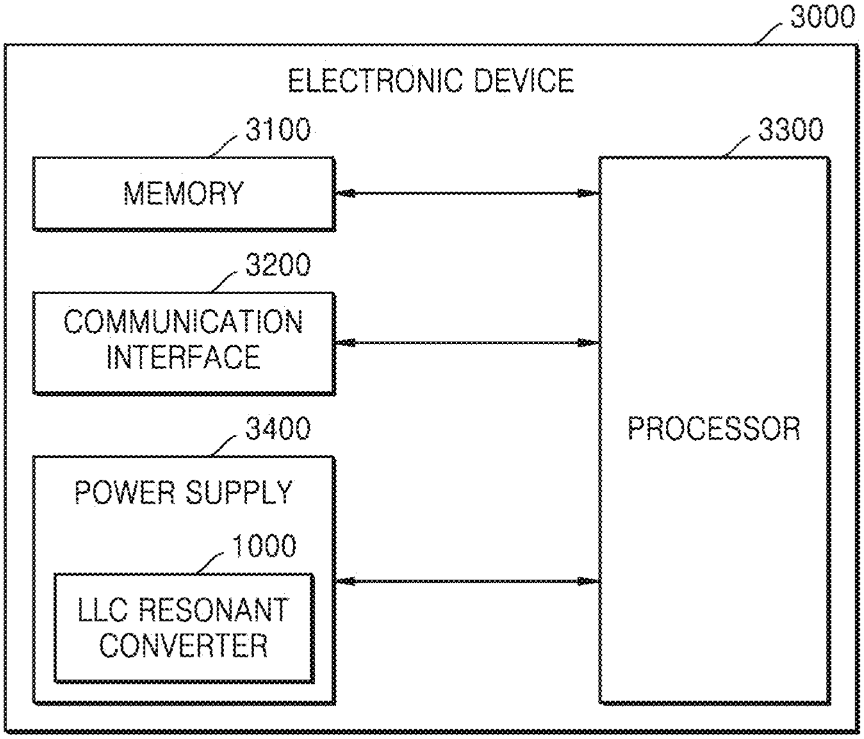
FIG. 11 is a block diagram illustrating an example configuration of an electronic device including a power supply that includes an LLC resonant converter, according to various embodiments.

FIG. 11 is a block diagram illustrating an example configuration of an electronic device including a power supply that includes an LLC resonant converter, according to various embodiments.

Referring to FIG. 11, an electronic device 3000 according to an embodiment of the disclosure may be realized as any type of electronic device, such as a computer main body, an electric vehicle, a server processing device, or a home appliance like a setup box, a refrigerator, or a washing machine. Also, the electronic device 3000 of FIG. 11 may include the display device 2000 of FIG. 10.

According to an embodiment of the disclosure, the electronic device 3000 may include a memory 3100, a communication interface (e.g., including communication circuitry) 3200, at least one processor (e.g., including processing circuitry) 3300, and a power supply 3400. However, the components of the electronic device 3000 shown in FIG. 11 are not all essential components. The electronic device 3000 may be implemented by more components than those illustrated in FIG. 11 or the electronic device 3000 may be implemented by fewer components than those illustrated in FIG. 11.

According to an embodiment of the disclosure, the memory 3100, the communication interface 3200, the at least one processor 3300, and the power supply 3400 may be electrically and/or physically connected to each other.

According to an embodiment of the disclosure, the memory 3100 may include, for example, at least one type of storage medium among a flash memory type, a hard disk type, a multimedia card micro type, a card type memory (for example, a secure digital (SD) or an extreme digital (XD) memory), a random access memory (RAM), a static RAM (SRAM), a read-only memory (ROM), an electrically erasable programmable ROM (EEPROM), a programmable ROM (PROM), a magnetic memory, a magnetic disk, or an optical disk. The memory 3100 may store instructions or program code for performing functions or operations of the electronic device 3000. The instructions, algorithms, data structures, program code, and application programs, which are stored in the memory 3100, may be implemented in, for example, a programming or scripting language, such as C, C++, Java, or assembler.

According to an embodiment of the disclosure, the memory 3100 may store various types of modules that may be used for operations of the electronic device 3000. A "module" included in the memory 3100 may denote a unit of processing functions or operations performed by the at least one processor 3300. The "module" included in the memory 3100 may be realized by instructions, algorithms, data structures, or software such as program code.

According to an embodiment of the disclosure, the communication interface 3200 may include various communication circuitry and perform data communication with an external server according to control by the at least one processor 3300. Also, the communication interface 3200 may perform data communication with other electronic devices, in addition to the external server.

According to an embodiment of the disclosure, the communication interface 3200 may perform data communication with the external server or the other electronic devices using at least one of data communication methods including wired local area network (LAN), wireless LAN, Wi-Fi, Bluetooth, ZigBee, Wi-Fi direct (WFD), infrared data association (IrDA), Bluetooth low energy (BLE), near field communication (NFC), wireless broadband Internet (Wibro), world interoperability for microwave access (WiMAX), shared wireless access protocol (SWAP), wireless gigabit alliance (WiGig), and radio frequency (RF) communication.

According to an embodiment of the disclosure, the at least one processor 3300 may control operations of the electronic device 3000. The at least one processor 3300 may control operations of the electronic device 3000 by executing at least one instruction stored in the memory 3100. The at least one processor 3300 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to an embodiment of the disclosure, the power supply 3400 may supply, to the at least one processor 3300, power required for operations of the at least one processor 3300. According to an embodiment of the disclosure, the power supply 3400 may include the LLC resonant converter 1000 of the disclosure. The power supply 3400 may provide, to the at least one processor 3300, power of at least one power required for operations of the at least one processor 3300, based on the output voltage generated through the LLC resonant converter 1000. Also, the power supply 3400 may supply, to the communication interface 3200, power required for operations of the communication interface 3200.

According to an example embodiment of the disclosure, provided is an LLC resonant converter including a primary side circuit and a secondary side circuit. The secondary side circuit may include: a first diode including a first anode electrically connected to a first node. The secondary side circuit may include a second diode including a second anode electrically connected to the first node. The secondary side circuit may include a first inductor configured to receive power through the primary side circuit and electrically connected between a first cathode of the first diode and a second node. The secondary side circuit may include a second inductor configured to receive power through the primary side circuit and electrically connected between the second node and a second cathode of the second diode. The secondary side circuit may include a first capacitor electrically connected between the first node and the second node. The secondary side circuit may include a third inductor electrically connected between the first cathode of the first diode and a third node. The secondary side circuit may include a fourth inductor electrically connected between the second cathode of the second diode and the third node. The secondary side circuit may include a second capacitor electrically connected between the first node and the third node.

According to an example embodiment of the disclosure, the first inductor may include a first coil and the second inductor may include a second coil. The number of turns of the first coil may be the same as the number of turns of the second coil. A winding direction of the first coil and a winding direction of the second coil may be the same.

According to an example embodiment of the disclosure, the third inductor and the fourth inductor may be inductors that are inductively coupled to each other. The third inductor may include a third coil and the fourth inductor may include a fourth coil. A winding direction of the third coil and a winding direction of the fourth coil may be different from each other.

According to an example embodiment of the disclosure, a ratio of capacitance of the first capacitor to capacitance of the second capacitor may be determined according to a ratio of a size of a first current flowing through the first capacitor to a size of a second current flowing through the second capacitor.

According to an example embodiment of the disclosure, the first capacitor may include a plurality of first sub-capacitors connected to each other in parallel, and the second capacitor may include a plurality of second sub-capacitors connected to each other in parallel.

According to an example embodiment of the disclosure, based on capacitance of each of the plurality of first sub-capacitors being the same as capacitance of each of the plurality of second sub-capacitors, a ratio of the number of the plurality of first sub-capacitors to the number of the plurality of second sub-capacitors may be determined according to the ratio of the size of the first current to the size of the second current.

According to an example embodiment of the disclosure, a load current may be provided to a load electrically connected to the first node and the third node.

According to an example embodiment of the disclosure, the primary side circuit may include a half-bridge circuit.

According to an example embodiment of the disclosure, the secondary side circuit may include: a first resistor electrically connected to the first node; a third capacitor electrically connected between the first resistor and the third node; a second resistor electrically connected to the first node; and a fourth capacitor electrically connected between the second resistor and the third node.

According to an example embodiment of the disclosure, the secondary side circuit may include: a first resistor electrically connected to the first node. The secondary side circuit may include a third capacitor electrically connected to the first resistor. The secondary side circuit may include a third diode including a third anode electrically connected to the third capacitor and a third cathode electrically connected to the third node. The secondary side circuit may include a second resistor electrically connected to the first node. The secondary side circuit may include a fourth capacitor electrically connected to the second resistor. The secondary side circuit may include a fourth diode including a fourth anode electrically connected to the fourth capacitor and a fourth cathode electrically connected to the third node.

According to an example embodiment of the disclosure, provided is a display device including a power supply that includes an LLC resonant converter including a primary side circuit and a secondary side circuit. The display device further includes: a display and at least one processor configured to control an operation of the display. The power supply is configured to supply power to the at least one processor. The secondary side circuit may include a first diode including a first anode electrically connected to a first node. The secondary side circuit may include a second diode including a second anode electrically connected to the first node. The secondary side circuit may include a first inductor configured to receive power through the primary side circuit and electrically connected between a first cathode of the first diode and a second node. The secondary side circuit may include a second inductor configured to receive power through the primary side circuit and electrically connected between the second node and a second cathode of the second diode. The secondary side circuit may include a first capacitor electrically connected between the first node and the second node. The secondary side circuit may include a third inductor electrically connected between the first cathode of the first diode and a third node. The secondary side circuit may include a fourth inductor electrically connected between the second cathode of the second diode and the third node. The secondary side circuit may include a second capacitor electrically connected between the first node and the third node.

According to an example embodiment of the disclosure, provided is an electronic device including: a power supply including an LLC resonant converter including a primary side circuit and a secondary side circuit. The electronic device further includes at least one processor configured to control an operation of the electronic device. The power supply is configured to supply power to the at least one processor. The secondary side circuit may include a first diode including a first anode electrically connected to a first node. The secondary side circuit may include a second diode including a second anode electrically connected to the first node. The secondary side circuit may include a first inductor configured to receive power through the primary side circuit and electrically connected between a first cathode of the first diode and a second node. The secondary side circuit may include a second inductor configured to receive power through the primary side circuit and electrically connected between the second node and a second cathode of the second diode. The secondary side circuit may include a first capacitor electrically connected between the first node and the second node. The secondary side circuit may include a third inductor electrically connected between the first cathode of the first diode and a third node. The secondary side circuit may include a fourth inductor electrically connected between the second cathode of the second diode and the third node. The secondary side circuit may include a second capacitor electrically connected between the first node and the third node.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An LLC resonant converter comprising a primary side circuit and a secondary side circuit, wherein the secondary side circuit comprises:

a first diode including a first anode electrically connected to a first node;

a second diode including a second anode electrically connected to the first node;

a secondary-side winding configured to receive power from the primary side circuit, the secondary-side winding including a first inductor electrically connected between a first cathode of the first diode and a second node and a second inductor electrically connected between the second node and a second cathode of the second diode;

a first capacitor electrically connected between the first node and the second node;

a third inductor electrically connected between the first cathode of the first diode and a third node;

a fourth inductor electrically connected between the second cathode of the second diode and the third node; and a second capacitor electrically connected between the first node and the third node.

2. The LLC resonant converter of claim 1, wherein the first inductor comprises a first coil and the second inductor comprises a second coil, a number of turns of the first coil is the same as a number of turns of the second coil, and a winding direction of the first coil is the same as a winding direction of the second coil.

3. The LLC resonant converter of claim 1, wherein the third inductor and the fourth inductor are inductively coupled to each other, the third inductor comprises a third coil and the fourth inductor comprises a fourth coil, and a winding direction of the third coil and a winding direction of the fourth coil are different from each other.

4. The LLC resonant converter of claim 1, wherein a ratio of a capacitance of the first capacitor to a capacitance of the second capacitor is determined according to a ratio of a size of a first current flowing through the first capacitor to a size of a second current flowing through the second capacitor.

5. The LLC resonant converter of claim 4, wherein the first capacitor comprises a plurality of first sub-capacitors connected to each other in parallel, and the second capacitor comprises a plurality of second sub-capacitors connected to each other in parallel.

6. The LLC resonant converter of claim 5, wherein, based on a capacitance of each of the plurality of first sub-capacitors being the same as a capacitance of each of the plurality of second sub-capacitors, a ratio of a number of the plurality of first sub-capacitors to a number of the plurality of second sub-capacitors is determined according to the ratio of the size of the first current to the size of the second current.

7. The LLC resonant converter of claim 1, configured to provide a load current to a load electrically connected to the first node and the third node.

8. The LLC resonant converter of claim 1, wherein the primary side circuit comprises a half-bridge circuit.

9. The LLC resonant converter of claim 1, wherein the secondary side circuit comprises:

a first resistor electrically connected to the first node; and a third capacitor electrically connected between the first resistor and the third node.

10. The LLC resonant converter of claim 1, wherein the secondary side circuit comprises:

a first resistor electrically connected to the first node;

a third capacitor electrically connected to the first resistor;

a third diode including a third anode electrically connected to the third capacitor and a third cathode electrically connected to the third node;

a second resistor electrically connected to the first node;

a fourth capacitor electrically connected to the second resistor; and a fourth diode including a fourth anode electrically connected to the fourth capacitor and a fourth cathode electrically connected to the third node.

11. A display device comprising a power supply including an LLC resonant converter comprising a primary side circuit and a secondary side circuit, wherein the display device comprises:

a display; and at least one processor configured to control an operation of the display, the power supply is configured to supply power to the at least one processor, and the secondary side circuit comprises:

a first diode including a first anode electrically connected to a first node;

a second diode including a second anode electrically connected to the first node;

a secondary-side winding configured to receive power from the primary side circuit, the secondary-side winding including a first inductor electrically connected between a first cathode of the first diode and a second node and a second inductor electrically connected between the second node and a second cathode of the second diode;

a first capacitor electrically connected between the first node and the second node;

a third inductor electrically connected between the first cathode of the first diode and a third node;

a fourth inductor electrically connected between the second cathode of the second diode and the third node; and a second capacitor electrically connected between the first node and the third node.

12. The display device of claim 11, wherein the first inductor comprises a first coil and the second inductor comprises a second coil, a number of turns of the first coil is the same as a number of turns of the second coil, and a winding direction of the first coil is the same as a winding direction of the second coil.

13. The display device of claim 11, wherein the third inductor and the fourth inductor are inductively coupled to each other, the third inductor comprises a third coil and the fourth inductor comprises a fourth coil, and a winding direction of the third coil and a winding direction of the fourth coil are different from each other.

14. The display device of claim 11, wherein a ratio of a capacitance of the first capacitor to a capacitance of the second capacitor is determined according to a ratio of a size of a first current flowing through the first capacitor to a size of a second current flowing through the second capacitor.

15. The display device of claim 14, wherein the first capacitor comprises a plurality of first sub-capacitors connected to each other in parallel, and the second capacitor comprises a plurality of second sub-capacitors connected to each other in parallel.

16. An electronic device comprising a power supply including an LLC resonant converter comprising a primary side circuit and a secondary side circuit, wherein the electronic device comprises at least one processor configured to control an operation of the electronic device, the power supply is configured to supply power to the at least one processor, and the secondary side circuit comprises:

a first diode including a first anode electrically connected to a first node;

a second diode including a second anode electrically connected to the first node;

a secondary-side winding configured to receive power from the primary side circuit, the secondary-side winding including a first inductor electrically connected between a first cathode of the first diode and a second node and a second inductor electrically connected between the second node and a second cathode of the second diode;

a first capacitor electrically connected between the first node and the second node;

a third inductor electrically connected between the first cathode of the first diode and a third node;

a fourth inductor electrically connected between the second cathode of the second diode and the third node; and a second capacitor electrically connected between the first node and the third node.

17. The electronic device of claim 16, wherein the first inductor comprises a first coil and the second inductor comprises a second coil, a number of turns of the first coil is the same as a number of turns of the second coil, and a winding direction of the first coil is the same as a winding direction of the second coil.

18. The electronic device of claim 16, wherein the third inductor and the fourth inductor are inductively coupled to each other, the third inductor comprises a third coil and the fourth inductor comprises a fourth coil, and a winding direction of the third coil and a winding direction of the fourth coil are different from each other.

19. The electronic device of claim 16, wherein a ratio of a capacitance of the first capacitor to a capacitance of the second capacitor is determined according to a ratio of a size of a first current flowing through the first capacitor to a size of a second current flowing through the second capacitor.

20. The electronic device of claim 19, wherein the first capacitor comprises a plurality of first sub-capacitors connected to each other in parallel, and the second capacitor comprises a plurality of second sub-capacitors connected to each other in parallel.

* * * * *